(12) United States Patent
Drmota Petric et al.

(10) Patent No.: US 12,418,212 B2
(45) Date of Patent: Sep. 16, 2025

(54) STATOR COMPONENT OF AN ELECTRODYNAMIC MACHINE

(71) Applicant: KOLEKTOR Mobility D.O.O., Idrija (SI)

(72) Inventors: Ana Drmota Petric, Idrija (SI); Edvard Razpet, Cerkno (SI); Primoz Peternel, Idrija (SI); Ludvik Kumar, Logatec (SI)

(73) Assignee: KOLEKTOR MOBILITY D.O.O., Idrija (SI)

( * ) Notice: Subject to any disclaimer, the term of this patent is extended or adjusted under 35 U.S.C. 154(b) by 260 days.

(21) Appl. No.: 18/200,376

(22) Filed: May 22, 2023

(65) Prior Publication Data

US 2023/0299633 A1    Sep. 21, 2023

Related U.S. Application Data

(63) Continuation of application No. PCT/EP2021/081336, filed on Nov. 11, 2021.

(30) Foreign Application Priority Data

Nov. 25, 2020  (DE) ...................... 10 2020 131 220.2

(51) Int. Cl.
*H02K 5/08* (2006.01)
*F04D 13/06* (2006.01)

(52) U.S. Cl.
CPC .............. *H02K 5/08* (2013.01); *F04D 13/06* (2013.01)

(58) Field of Classification Search
CPC .......... H02K 11/30; H02K 11/33; H02K 5/08; H02K 5/04; H02K 5/22; H02K 5/225
See application file for complete search history.

(56) References Cited

U.S. PATENT DOCUMENTS 11,752,674 B2 * 9/2023 Drmota Petric .......... H02K 5/02
                                                    310/43
2005/0242678 A1 * 11/2005 Rittmeyer ................ H02K 3/28
                                                    310/179

(Continued)

FOREIGN PATENT DOCUMENTS

CN    105656221 A    6/2016
DE    2725796 A1     12/1978

(Continued)

OTHER PUBLICATIONS

WO2019082708A1 Translation (Year: 2019).*

(Continued)

*Primary Examiner* — Oluseye Iwarere
*Assistant Examiner* — Nicholas Lee Setzer
(74) *Attorney, Agent, or Firm* — Myers Wolin, LLC (57) ABSTRACT

A stator component of an electrodynamic machine is provided, having a plastic structure, a stator unit at least partly integrated into the plastic structure and having coil windings, an electronic controller, and multiple metal conductor elements, by which the windings connect to the controller. A part of the extension of the conductor elements is integrated into the plastic structure. The plastic structure is produced by injection molding onto a preassembled group including the stator unit and conductor elements connected to the coil windings. The plastic structure forms a collar adjacent each conductor element free end section which projects from the plastic structure and is paired with the contact of the controller, said collar surrounding the circumference of the conductor element and protruding beyond the rest of the plastic structure. The sections of the conductor elements passing through each collar have grooves filled with thermoplastic ribs of the plastic structure.

15 Claims, 5 Drawing Sheets

(56) References Cited

U.S. PATENT DOCUMENTS

2019/0058375 A1* 2/2019 Tokoi ............... H02K 5/225
2019/0229577 A1* 7/2019 Sambuichi ............ H02K 3/50
2021/0354746 A1* 11/2021 Kawata ............... H02K 5/225

FOREIGN PATENT DOCUMENTS

| DE | 4410455 C1 | 6/1995 | |
|---|---|---|---|
| DE | 102007042589 A1 | 3/2009 | |
| DE | 102009011731 A1 | 9/2010 | |
| DE | 102012202004 A1 | 8/2012 | |
| DE | 102014008815 A1 | 1/2016 | |
| DE | 112014005600 T5 | 9/2016 | |
| DE | 202017007244 U1 | 4/2020 | |
| JP | 2013111881 A | 6/2013 | |
| JP | 2019119093 A | 7/2019 | |
| WO | 2012107545 A1 | 8/2012 | |
| WO | WO-2019082708 A1 * | 5/2019 | ............ H02K 3/38 |
| WO | WO-2019219738 A1 * | 11/2019 | ......... H01R 13/521 |

OTHER PUBLICATIONS

WO2019219738A1 Translation (Year: 2019).*
International Search Report issued by the European Patent Office for International Patent Application No. PCT/EP2021/081336, mailed on Mar. 21, 2022.

* cited by examiner

STATOR COMPONENT OF AN ELECTRODYNAMIC MACHINE

CROSS REFERENCE TO RELATED APPLICATIONS

This application is a continuation under 35 U.S.C. § 120 of International Application PCT/EP2021/081336, filed Nov. 11, 2021, which claims priority to German Application No. 10 2020 131 220.2, filed Nov. 25, 2020, the contents of each of which are incorporated by reference herein.

FIELD OF THE INVENTION

The present invention relates to a stator component of an electrodynamic machine, especially of an electric motor, comprising a plastic structure, a stator unit at least partly embedded therein and provided with several coil windings, an electronic controller and several metallic conductor elements, via which the coil windings are connected to the electronic controller.

BACKGROUND

Stator components of the type indicated in the foregoing are known, for example, from CN 10 565 6221 A. They have proven themselves for various applications, for example as part of electric motors for motor-pump units used to convey liquid media. In the interest of particularly compact, relatively simply constructed motor-pump units, their motor rotor and pump rotor are frequently housed in a common space, so that the motor rotor runs "wet", i.e. the medium to be conveyed washes around it.

Especially when an aggressive medium (e.g. fuel, automatic transmission fluid) is involved, it is imperative to prevent this from reaching the electronic controller. Otherwise, this will be irreversibly damaged within a very short time.

With respect to the hermetic separation of the electronic controller from the inner space—housing a rotor of the electrodynamic machine—of the stator component, a challenge exists in that the conductor elements via which the coil windings are connected to the electronic controller must be led out of the plastic structure to ensure contacting of the electronic controller. As tests have shown, the risk that medium will creep along the surface of the conductor elements to the electronic controller is considerable; and so a noteworthy potential for damage exists in this respect.

In order to prevent damage to the electronic controller, various concepts have already been proposed and also applied in practice. On the one hand, the emphasis was on direct protection of the electronic controller, especially by encapsulating it with a thermoset plastic resin (especially an epoxy resin). On the other hand, the objective was improved hermetic sealing of the metallic conductor elements relative to the plastic structure. A first such approach consists in that the plastic structure (produced by injection molding from a thermoplastic) is respectively constructed as a type of small bowl where the conductor elements for contacting the electronic controller are led out of it, wherein the bowls in question are subsequently filled with a special sealing compound (potting material), which is characterized by particularly good properties of adhesion both to the metal of the conductor elements and to the plastic of the plastic structure. However, this is associated with considerable effort. A second approach in this respect consists in that the plastic structure is injected molded from a thermoset material that is optimized in terms of ability to adhere to the metal of the conductor elements and typically has a significantly lower processing viscosity as well as a lower coefficient of thermal expansion or contraction than thermoplastic. This means that not inconsiderable restrictions—due to the significantly more demanding processing of thermoset materials during injection molding compared with thermoplastics—are associated with this in terms of the configuration of the plastic structure, so that this must accept compromises with respect to the other requirements. The latter also applies as a result of the considerably restricted choice of materials, in the sense that optimization of the plastic structure from other points of view (e.g. of other essential material properties and costs, surface condition, thermal expansion behavior, etc.) must be given lower priority.

In this respect, a solution that is satisfactory from practical viewpoints or is sufficient as regards the stringent test procedures common in the automotive industry—e.g. an integrity test performed after repeated temperature shock treatment—has not yet been found. Why—compared with other applications involving a plastic structure injection molded around a metallic conductor element or other metallic insert—the problem of sealing between the metallic conductor element and the plastic structure is so difficult to solve precisely in the case of the stator components of electrodynamic machines in question here, and why sealing failure is observed even in stator components manufactured with considerable time and effort, is not known with certainty. One possible explanation could be that oscillations and vibrations that favor detachment of the plastic structure from the metallic conductor element are generated due to possible (minimal) imbalances of the rotating parts during operation of the electrodynamic machine.

SUMMARY

In view of the prior art discussed in the foregoing and of the disadvantages associated therewith, the present disclosure has a task of providing a stator component of the type mentioned in the introduction that is characterized by a combination of particularly favorable properties both during manufacture (e.g. broad choice of materials, broad freedom of configuration, low manufacturing costs) and during operation (e.g. good protection of the electronic controller from damage). In this context, in contrast to conventional components, the stator component is intended in particular to satisfy even the most modern and most stringent test procedures applied in the automotive industry, especially an integrity test performed after repeated thermal shock treatment (e.g. 600 cycles with respectively 90 minutes of heating to +90° C. and cooling to −40° C. during a temperature cycle taking place within at most 30 seconds).

The foregoing task is accomplished in that a stator component is characterized, in addition to the features explained in the introduction, in combinatorial interaction with these and with one another, in that the metallic conductor elements are embedded, over part of their extent in longitudinal direction between the contactings of the associated coil winding and the electronic controller, in the plastic structure and project out of this with a free end portion assigned to the contacting of the electronic controller, in that the plastic structure is produced by injection molding from a thermoplastic and specifically is injection molded onto the preassembled group of stator unit and conductor elements joined to its coil windings, in that, adjoining the respective free end portion of the metallic conductor element, the plastic structure respectively forms a cuff completely surrounding the metallic conductor element at its circumference and standing out freely from the rest of the plastic structure, in that the sealing between the plastic structure and the metallic conductor elements is achieved exclusively by the contact of the thermoplastic of the plastic structure with the respective metallic conductor element without a separate sealing material, and in that fine structurings in the form of grooves machined by means of laser engraving into the surface and filled with thermoplastic of the plastic structure are provided, all around the respective circumference, in the portions of the metallic conductor elements that penetrate the respective cuff.

By implementations of the present invention characterized by the foregoing combination of special features, it is possible to manufacture stator components that satisfy the requirements imposed by practical considerations to an extent not previously known (in total). To single out only some of the relationships that are regarded as essential for the special performance capability of embodiments of the inventive stator component: The construction of the plastic structure adjoining the respective free end portion (contacted with the electronic controller) of the metallic conductor element as a freely projecting cuff, which—standing out freely from the rest of the plastic structure and thus not joined to it, especially via stays, bridges, ribs or the like— completely surrounds the metallic conductor element in question at its circumference, contributes to flexibility in the region in question of the plastic structure. This ensures that the plastic structure can be deformed here in order to adapt it to the ensheathed conductor element. Thus the plastic structure is able, in the region of the cuff, to follow the thermal expansions of the conductor element (in the various directions), similarly to the case of deformation of the respective conductor element that occurs (due to manufacturing tolerances) during mounting of the electronic controller and/or to recurring (micro) deformations of the conductor element as a result of oscillations caused by imbalances of rotating parts of the electrodynamic machine. The plastic structure is able to follow even (micro) deformations, induced by shaking motions, of the conductor elements in the region of the cuffs surrounding the conductor elements. All of this is also true and precisely for plastic structures injection molded from typical thermoplastics (with their characteristic material properties, including internal damping). This contributes significantly to substantially reducing the stresses that occur during assembly and during operation between the conductor element and the plastic structure. This in turn decisively reduces the tendency to (long-term) detachment phenomena. Paired with the specific measures for improvement of the ability of the thermoplastic plastics to adhere to the metallic conductor element, it is possible in this way to achieve, without additional measures (at any case in the region of the cuffs), durable sealing of the boundary zone between conductor element and plastic structure. Thus it is ensured that media are prevented from being able to creep along the surface of the conductor elements to the electronic controller and to cause damage there. In this respect, it is even possible to utilize a positive feedback effect in the sense that, due to the possibility of manufacturing the plastic structure by injection molding from a thermoplastic (which is less difficult to process compared with thermoset materials), a significantly broadened margin of configuration is available with respect to constructive details of the plastic structure, thus permitting this to be further optimized in terms of function (instead of manufacturing). Thermoplastics that on the basis of their characteristic material properties are particularly suitable for implementation of the present invention are especially polybutylene terephthalate (PBT), high-density polyethylene (HDPE) and polyphenylene sulfide (PPS) as well as mixed plastics, which respectively contain PBT, HDPE or PPS—especially as a main component, i.e. exceeding 50%.

The positive effects explained in the foregoing are particularly evident when—according to a first preferred further development of the invention—the cuff (aside from a possible taper at the end; see below) has an at least largely homogeneous wall thickness. A "homogeneous" wall thickness in this sense exists when the wall thickness of the cuff does not vary substantially either in its longitudinal direction or in its circumferential direction, although this does not include a decrease of wall thickness of the cuffs over their length for technical reasons (for example, via mold-release chamfers required for removal from the injection-molding die). In the foregoing sense, it is particularly advantageous when the wall thickness of the cuff in the region of its greatest thickness is not more than 50%, preferably not more than 25%, particularly preferably not more than 15% larger than the wall thickness of the cuff in the region of its smallest thickness.

Not only the degree of homogeneity of the wall thickness of the cuffs but also the wall thickness as such has influence. This is the case because the deformability of the cuffs explained hereinabove depends on it, in cooperation with the material properties of the thermoplastic material of the plastic structure. To quote an example: In a stator component intended for a typical 240-watt BLDC motor and having a plastic structure made from PBT, the wall thickness of its cuff preferably amounts to between 1.0 and 1.6 mm. In the case of flat metallic conductor elements with a rectangular cross section, and assuming that the ratio of the edge lengths is at least 3:1 (e.g. 5.5 mm×0.8 mm), it is also possible to specify an expedient relation between the cross section of the conductor elements and the wall thickness of the cuffs. Specifically, it is favorable when the wall thickness of the cuffs is between 1.4 times and 1.9 times the value of the smaller edge lengths.

According to another preferred further development of the invention, it is particularly favorable for durably effective sealing between conductor element and plastic structure when the grooves of the fine structuring of the respective conductor element surface are oriented substantially perpendicular to the longitudinal direction of the metallic conductor element in question. Such an orientation of the grooves takes into account the (micro) deformations of the conductor elements (see above) that occur most frequently in typical application situations in the sense that it directly counteracts a danger induced by precisely these deformations of the conductor elements that the thermoplastic plastic structure will detach from the metallic conductor element. Likewise, a construction of the cuffs of the thermoplastic plastic structure has a very positive effect in the sense of a particularly small tendency to problematic detachment phenomena, such that respectively the cuff narrows at the end to a taper in the direction of the free end portion of the associated metallic conductor element. In the case of conical or beveled configuration of the taper in question, wedge or cone angles between 70° and 120° are very advantageous. Wedge or cone angles between 80° and 110° are particularly favorable.

In the rest of the fine structurings, grooves constructed with depths between 10 μm and 100 μm and/or widths between 3 μm and 50 μm have proved particularly favorable, with a preferred ratio between width and depth of the grooves between 0.6 and 1.5, particularly preferably between 0.8 and 1.2. The distance of the grooves from one another is also of influence on the adhesion of the thermoplastic plastic structure to the metallic conductor element. Preferably, the distance between two grooves adjacent to one another is at least just as large as the width of the grooves in question.

It is precisely in their combination and their synergistic interaction with one another that the characteristic configurations explained in the foregoing (substantially homogeneous wall thickness of the cuff, orientation of the grooves of the fine structuring substantially perpendicular to the longitudinal direction of the metallic conductor element in question, construction of the grooves of the fine structurings with depths between 10 μm and 100 μm and/or widths between 3 μm and 50 μm) lead for the first time to a stator component with heretofore unattained properties. This is because the unique physicochemical binding of the cuff achievable in this way to the respective conductor element routed through it enables the stator component in question to satisfy—without more extensive measures, such as especially additional seals—the most stringent requirements concerning protection of the electronic controller even in the case of construction of the cuff from a thermoplastic material. In connection with the further configuration features, the efficient micromechanical engagement (micromechanical interlocking: MMI) effectively counteracts phenomena of detachment of the cuff from the respective associated conductor element, so that not only greatly differing contractions of thermoplastic and metal during the manufacturing process but also demanding inspection and test procedures (see above) remain without detrimental impacts on the hermitic barriers in front of the electronic controller.

According to yet another preferred further development of the invention, the conductor elements are respectively provided in the region of their sheathing with the cuff of the plastic structure with at least one opening filled with thermoplastic material of the plastic structure. This is the case in particular for conductor elements having a pronounced flat cross section, in which the dimension in one direction is at least three times as large as the dimension orthogonal to that direction (e.g. 5.5 mm×0.8 mm). Such openings act very advantageously in two respects. They induce a resistance to heat conduction, so that the heat introduced into the conductor elements while the electronic controller is being soldered onto them does not lead to heating of the conductor elements (especially in the region of the fine structuring) that could harm the media-tight binding of the plastic structure to the conductor elements. And, furthermore, a thermoplastic "bridge" extending between the two sides through the at least one opening represents an effective additional measure against the danger of detachment of the thermoplastic from the surface of the metallic conductor element.

Likewise, for minimization of the heat input into the conductor segments during soldering of the electronic controller, it is advantageous according to yet another further development when the conductor elements are bifurcated—by an incision—at their ends. Such a bifurcated construction of the conductor elements additionally reduces possible constraints during mounting of the electronic controller, and this likewise acts favorably.

As the foregoing explanations of the embodiments of the invention demonstrate, what is decisive for the positive effect is the interaction of the cuff of the thermoplastic plastic structure with the surface treatment of the conductor elements that achieves an improvement of the ability of the thermoplastic plastic to adhere to the metallic conductor element, or in other words its respective fine structuring. This in turn can be recognized in that the ratio of cuffs and fine structurings, also defined by their spatial association with one another, is not inconsiderable. In this sense, according to yet another preferred further development of the invention, it is particularly advantageous when the length of the portion of the metallic conductor element equipped with the fine structuring is respectively at least 50%, preferably 65% of the free length of the cuff parallel to the longitudinal direction of the associated metallic conductor element, wherein this "free length" of the cuff is to be understood as its extent that projects relative to the other plastic structure. It also proves to be very advantageous when respectively at least 80%, preferably at least 90% of the length of the portion of the metallic conductor element equipped with the fine structuring is disposed in the region of the cuff. It is quite particularly favorable when the portion of the metallic conductor element provided with the fine structuring is disposed completely, i.e. to the proportion of 100%, in the region of the cuff.

As far as the free length of the cuff (determined parallel to the longitudinal direction of the associated conductor element) is concerned, it is related to the dimensions of the conductor element. In the case of flat metallic conductor elements with a rectangular cross section, in which the ratio of the edges is at least 3:1, the free length of the cuff is preferably 0.7 to 1.0 times, particularly preferably 0.8 to 0.9 times as large as the larger of the two dimensions of the metallic conductor elements transverse to their longitudinal direction.

The relationships between the electronic controller (especially its mounting with contacting of the conductor elements and possible shaking movements during operation) and the various deformation loads acting on the conductor elements have already been discussed hereinabove. With respect to these relationships, the advantages achievable due to the implementations of the invention are particularly evident in such stator components in which the electronic controller, especially an associated printed-circuit board, is fixed directly on the plastic structure via one or more connection points. In this case, it is also favorable when the electronic controller is housed in a space bounded by the thermoplastic plastic structure and a cover joined to it and covering the electronic controller.

BRIEF DESCRIPTION OF THE DRAWING

The present invention will be explained in more detail in the following on the basis of a preferred exemplary embodiment illustrated in the drawing, wherein.

DETAILED DESCRIPTION OF THE PREFERRED EMBODIMENTS

Figure 1:
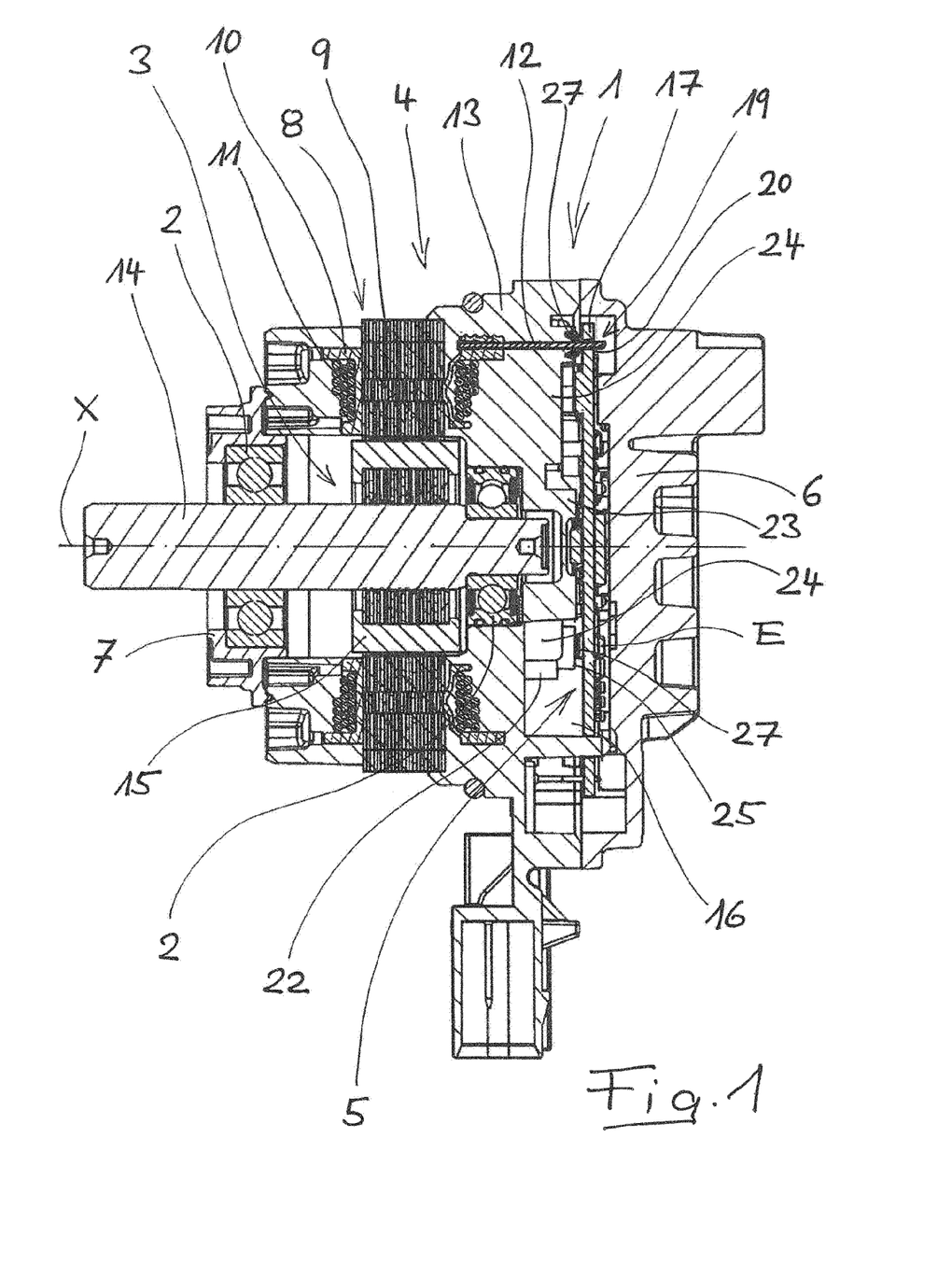
FIG. 1 shows an axial section through an electrodynamic machine according to the prior art constructed as an electric motor.

The electric motor illustrated in FIG. 1 comprises a stator 1 and a rotor 3 mounted therein by means of two rolling bearings 2 in order to rotate around the axis X. Stator 1 possesses an integrated stator component 4, an electronic controller 5, a cover 6 and a bearing cover 7. Stator component 4 for its part comprises a stator unit 8 having, disposed around axis X, pole pieces 9 with winding carriers 10 and coil windings 11 mounted on these, metallic conductor elements (pins) 12 contacted with the latter and a plastic structure 13, which is molded by injection molding onto the preassembled subassembly of stator unit 8 and conductor elements 12. Rotor 3 comprises a rotor shaft 14 and a rotor armature 15 mounted thereon.

Electronic controller 5—received in a cavity 16 formed between plastic structure 13 and cover 6—comprises a printed-circuit board 17 populated with electronic modules E. This is supported on pegs 18, which are part of plastic structure 13. Conductor elements 12 are embedded for only part of their length in plastic structure 13; they respectively project out of the latter with a free end portion 19, via which, by engaging in an associated opening 20 of printed-circuit board 17, contacting with electronic controller 5 is established.

The situation is analogous for the neutral pin 21.

In the region of the three conductor elements 12 and of neutral pin 21, plastic structure 13 is respectively constructed in the form of a base 22. Each base 22 is joined to central region 23 of plastic structure 13 via a stiffening rib 24. At the front side, the respective base 22 is constructed as a miniature bowl 25, which surrounds the conductor element 12 in question or the neutral pin 21 and in which a central, approximately pyramidal or roof-like prominence 26 is disposed. The miniature bowl 25 in question is filled—prior to mounting of electronic controller 5—with a sealing compound (potting material) 27 (shown only in FIGS. 1 and 4).

Figure 2:
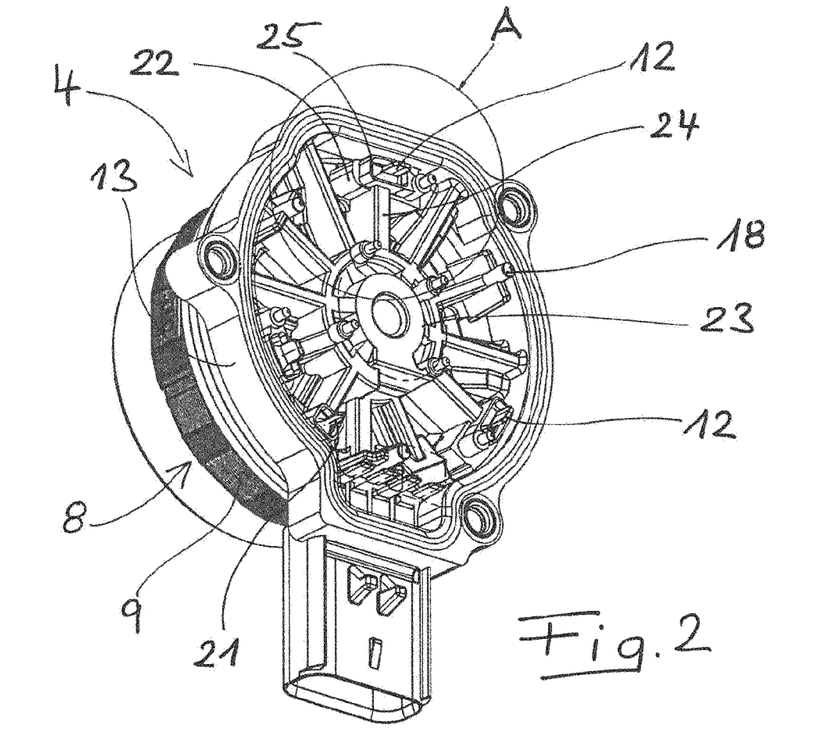
FIG. 2 shows the stator component of the electric motor according to FIG. 1 in perspective view.
Figure 3:
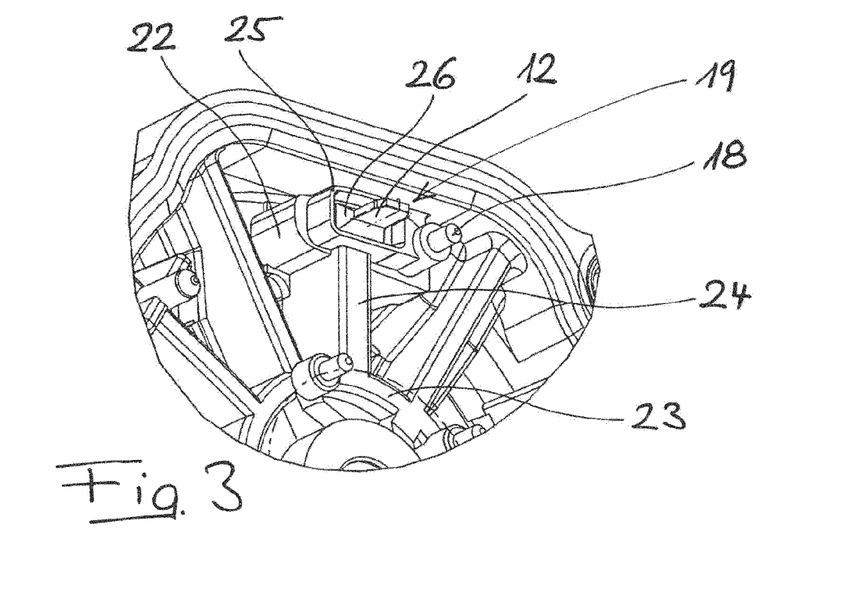
FIG. 3 shows Detail A of the stator component according to FIG. 2.
Figure 4:
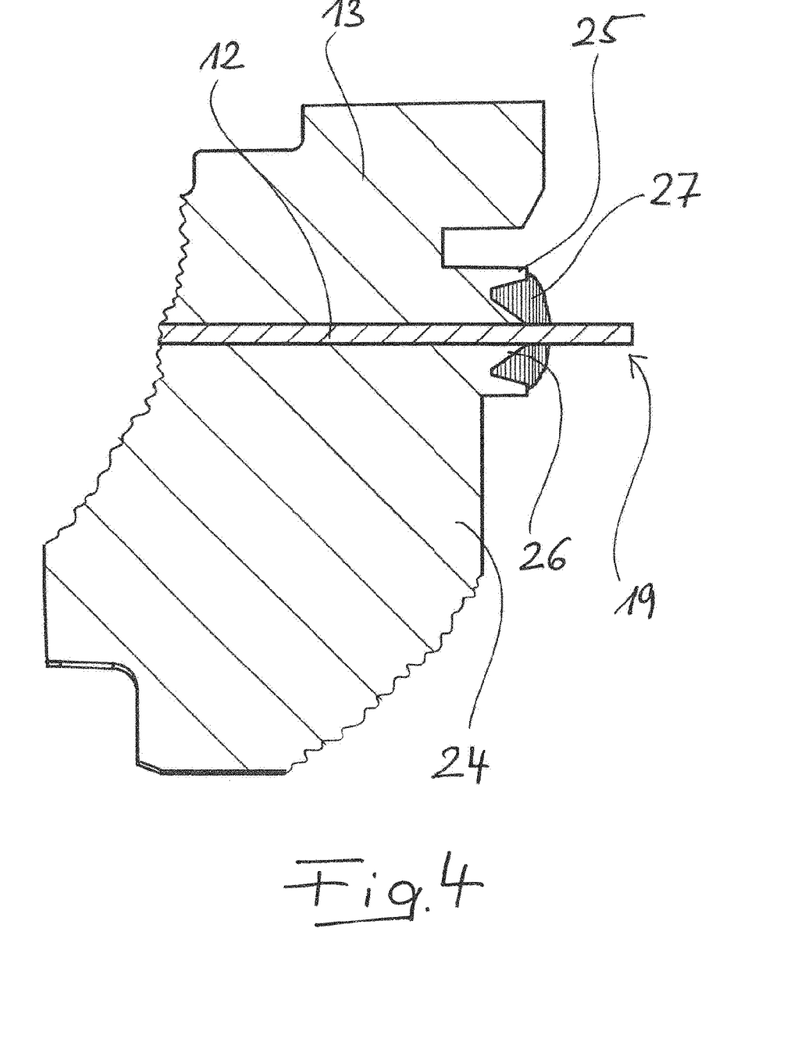
FIG. 4 shows a section through a further enlarged detail of the stator component according to FIGS. 2 and 3.

Now that electric motors having stator components of the configuration shown in FIGS. 2 to 4 are known (e.g. as drive motors for oil pumps of the Tesla Model 3) and further details are not needed for understanding of the present invention, a more extensive explanation will not be provided as this place.

Figure 5:
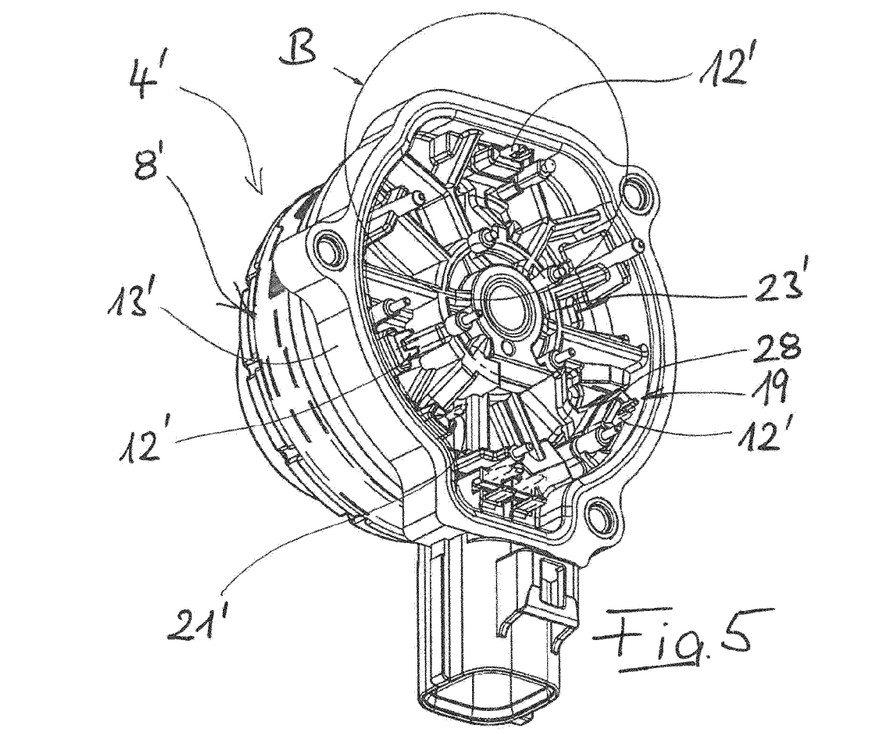
FIG. 5 shows a stator component according to an embodiment of the present invention in perspective view.
Figure 6:
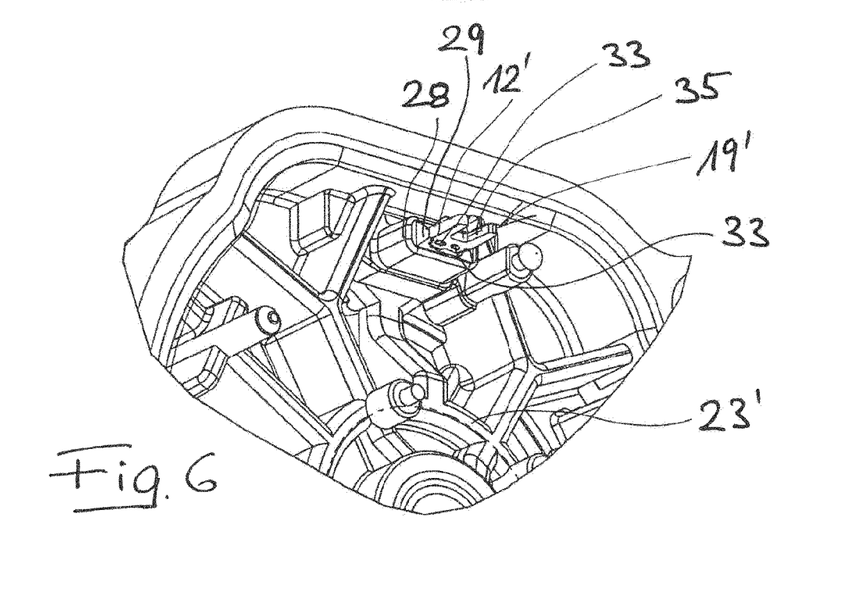
FIG. 6 shows Detail B of the stator component according to FIG. 5
Figure 7:
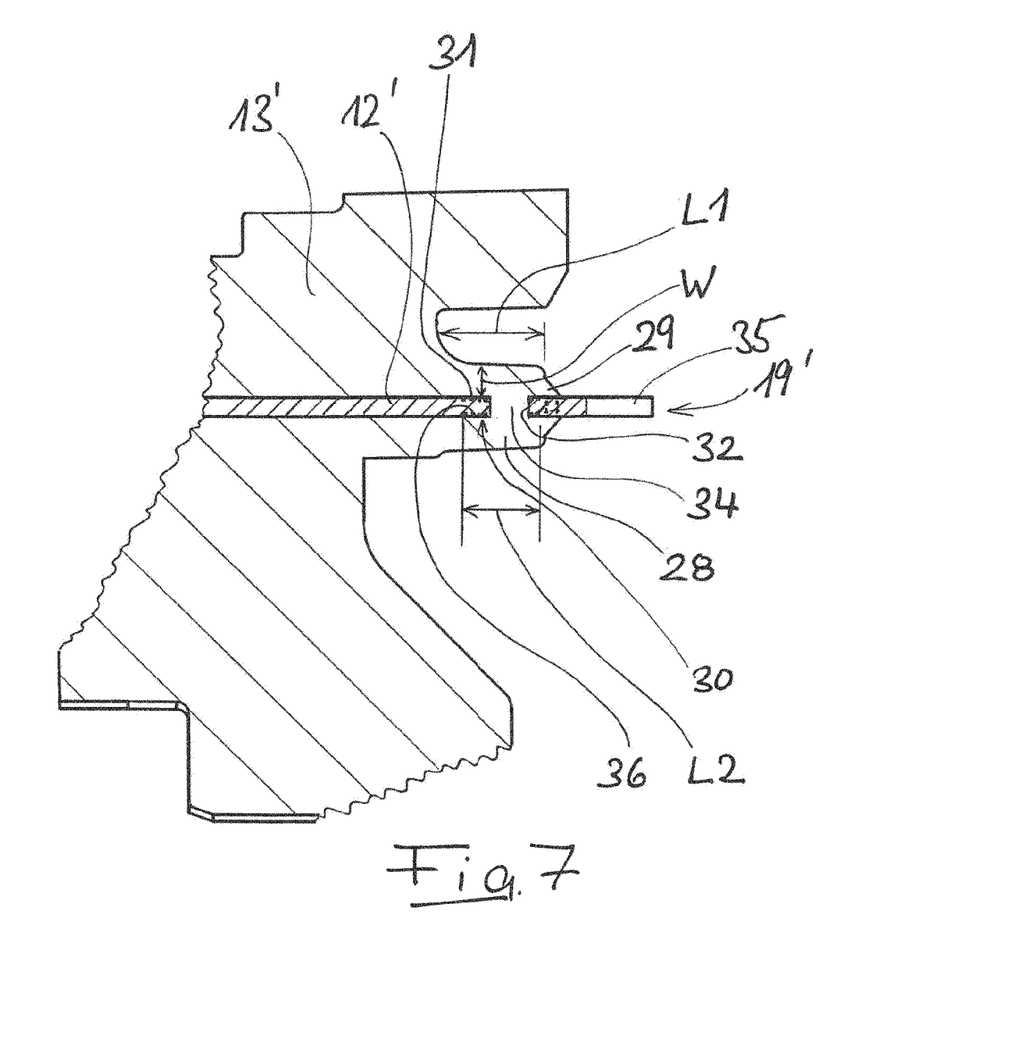
FIG. 7 shows a section through a further enlarged detail of the stator component according to FIGS. 5 and 6.

With respect to basic configuration features the stator component 4' constructed according to an embodiment of the present invention and illustrated in FIGS. 5 to 7 resembles that according to FIGS. 2 to 4. In this respect, the following description refrains from a repeated complete explanation and is limited instead to presentation of the relevant differences.

A particularly striking, substantial difference consists in that, in the case of plastic structure 13' (injection-molded from PBT), the overmolding of conductor elements 12' does not consist of respectively a thick-walled base, which is additionally joined via a stiffening rib with central region 23' of the plastic structure. To the contrary, the conductor elements 12' are respectively surrounded—again over a partial region of their length—over their circumference by a relatively thin-walled cuff 28, which rises freely above the rest of the plastic structure 13' along the entire circumference. These cuffs 28 have an at least largely homogeneous wall thickness W. In the case of a cross section of the respective conductor element equal to 5.5 mm×0.8 mm, the mean wall thickness W of the cuff 28 surrounding this is approximately 1.3 mm and its free length L1 is approximately 4.5 mm. At the end, the respective cuff 28 narrows in the direction of the free end portion 19' of the associated metallic conductor element 12' to a taper 29.

In the portions of metallic conductor elements 12' that penetrate the respective cuffs 28, fine structurings 30—illustrated only schematically and not to scale in the drawing—exist all around their circumference in the form of grooves 31, which are machined by means of laser engraving in the surface with depths of approximately 50 μm and widths of approximately 10 μm and which are oriented parallel to one another and perpendicular to the longitudinal direction of the metallic conductor elements 12' in question. The distance between two such grooves 31 adjacent to one another is approximately 20 The length L2 of the portion of the respective metallic conductor element 12' equipped with fine structuring 30 is respectively approximately 3.5 mm, in other words approximately 75% of the free length L1 of cuff 28; and this portion of metallic conductor 12' equipped with fine structuring 30 is disposed completely in the region of cuff 28. In this respect, the construction of neutral pin 21' is analogous to that of conductor elements 12'.

Each conductor element 12' has three openings 32 and 33 passing transversely through it. A first opening 32—constructed in the form of an elongated oval—is situated in that portion of the respective conductor element 12' where this has fine structuring 30 on its surface. Two (approximately round) openings 33—which are made visible in FIG. 6 by appropriately broken-away plastic structure of taper 29—are situated in the region of the respective conductor element 12' covered by taper 29 at the end of cuff 28. A thermoplastic "bridge" 34 extends through each of the three openings 32 and 33 and connects the regions of cuff 28 and of taper 29 situated on two oppositely disposed sides of conductor element 12' with one another.

It is further apparent that, in contrast to the prior art illustrated in FIGS. 1 to 4, the end portions 19' (used for contacting with the electronic controller) of conductor elements 12' have an incision 35 at the end and in this way are of bifurcated construction.

Stator component 4' is characterized by excellent sealing behavior between metallic conductor elements 12' and PBT plastic structure 13', which—via ribs 36 corresponding to grooves 31 and filling them—is meshed with them via tooth-like engagement, and at the same time by very good fatigue strength and only the slightest tendency to detachment phenomena. In this way, sealing between plastic structure 13' and metallic conductor elements 12' is achieved exclusively by the contact of the PBT thermoplastic of plastic structure 13' with the respective metallic conductor element 12'; a separate sealing material (such as the potting material provided according to the prior art) is not used.

What is claimed is:

1. A stator component (4') of an electrodynamic machine, especially of an electric motor, comprising a plastic structure (13'), a stator unit (8') at least partly embedded therein and provided with several coil windings (11), an electronic controller (5) and several metallic conductor elements (12'), via which the coil windings (11) are connected to the electronic controller (5), wherein the metallic conductor elements (12') are embedded, over part of their extent in longitudinal direction between the contactings of the associated coil winding (11) and the electronic controller (5), in the plastic structure (13') and project out of this with a free end portion (19') assigned to the contacting of the electronic controller (5), with the following features:

the plastic structure (13') is produced from a thermoplastic and is formed onto the preassembled group of stator unit (8') and conductor elements (12') joined to its coil windings (11);

adjoining the respective free end portion (19') of the metallic conductor element (12'), the plastic structure (13') respectively forms a cuff (28) completely surrounding the metallic conductor element (12') at a circumference of and at a single cross-sectional location along the metallic conductor element and standing out freely from the rest of the plastic structure;

a seal between the plastic structure (13') and the metallic conductor elements (12') is achieved exclusively by the contact of the thermoplastic of the plastic structure (13') with the respective metallic conductor element (12'), without a separate sealing material;

fine structurings (30) in the form of grooves (31) machined into the surface and filled with thermoplastic ribs (36) of the plastic structure (13') are provided, all around the respective circumference, in the portions of the metallic conductor elements (12') that penetrate the respective cuff (28).

2. The stator component of claim 1, wherein the grooves (31) are oriented substantially perpendicular to the longitudinal direction of the metallic conductor element (12') in question.

3. The stator component of claim 1, wherein the grooves (31) are constructed with depths between 10 μm and 100 μm.

4. The stator component of claim 1, wherein the grooves (31) are constructed with widths between 3 μm and 50 μm.

5. The stator component of claim 1, wherein a ratio between width and depth of the grooves (31) is between 0.6 and 1.5.

6. The stator component of claim 1, wherein the distance between two grooves (31) adjacent to one another is at least just as large as the width of the grooves (31) in question.

7. The stator component of claim 1, wherein a length (L2) of a portion equipped with the fine structuring (30) is respectively at least 50% of a free length (L1) of the cuff (28) parallel to the longitudinal direction of the associated metallic conductor element (12').

8. The stator component of claim 1, wherein at least 80% of the length (L2) of the portion of the metallic conductor element (12') equipped with the fine structuring (30) is disposed in the region of the cuff (28).

9. The stator component of claim 1, wherein, in the case of conductor elements (12') with rectangular cross section, a free length (L1) of the cuff (28) parallel to the longitudinal direction of the associated conductor element (12') is at least 0.7 to 1.0 times as large as the larger of the two dimensions of the metallic conductor elements (12') transverse to their longitudinal direction.

10. The stator component of claim 1, wherein the cuff (28) narrows at the end in the direction of the free end portion (19') of the associated metallic conductor element (12') to a taper (29).

11. The stator component of claim 1, wherein the cuffs (28) have an at least largely homogeneous wall thickness (W).

12. The stator component of claim 11, wherein the wall thickness (W) of the cuff (28) in the region of its greatest thickness is not more than 50% larger than the wall thickness of the cuff in question in the region of its smallest thickness.

13. The stator component of claim 1, wherein the conductor elements (12') are respectively provided in the region of their sheathing with the cuff (28) of the plastic structure (13') with at least one opening (32, 33) filled with thermoplastic material of the plastic structure (13').

14. The stator component of claim 1, wherein the free end portions (19') of the conductor elements (12') are of bifurcated construction, in that they have an incision (35) at the end.

15. The stator component of claim 1, wherein the electronic controller (5) is fixed on the plastic structure (13') and covered by a cover (6) joined thereto.

\* \* \* \* \*